US012607441B2

(12) United States Patent　　　(10) Patent No.: US 12,607,441 B2

Blanchard　　　(45) Date of Patent: Apr. 21, 2026

(54) 3D PRINTED DRIFT DEVICE

(71) Applicant: Stewart Tubular Products LLC, Houston, TX (US)

(72) Inventor: Christopher Blanchard, Houston, TX (US)

(73) Assignee: STEWART TUBULAR PRODUCTS LLC, Houston, TX (US)

( * ) Notice: Subject to any disclaimer, the term of this patent is extended or adjusted under 35 U.S.C. 154(b) by 419 days.

(21) Appl. No.: 18/496,183

(22) Filed: Oct. 27, 2023

(65) Prior Publication Data

US 2025/0137771 A1　May 1, 2025

(51) Int. Cl.
| | |
|---|---|
| *G01B 3/50* | (2006.01) |
| *B33Y 40/20* | (2020.01) |
| *B33Y 80/00* | (2015.01) |
| B29C 64/188 | (2017.01) |
| B33Y 10/00 | (2015.01) |

(52) U.S. Cl.
CPC .............. *G01B 3/50* (2013.01); *B33Y 40/20* (2020.01); *B33Y 80/00* (2014.12); *B29C 64/188* (2017.08); *B33Y 10/00* (2014.12)

(58) Field of Classification Search
CPC ....................................................... G01B 3/50
USPC ................................ 33/542, 543, 544, 555.1
See application file for complete search history.

(56) References Cited

U.S. PATENT DOCUMENTS

| | | | | |
|---|---|---|---|---|
| 1,162,720 | A | * | 11/1915 | Hirth ........................ G01B 5/12 |
| | | | | 33/517 |
| 1,628,741 | A | * | 5/1927 | Holt ........................ G01B 5/08 |
| | | | | 33/704 |

| | | | | |
|---|---|---|---|---|
| 2,428,326 | A | | 9/1947 | Fay |
| 3,886,665 | A | * | 6/1975 | Lowen ................... G01B 7/281 |
| | | | | 33/544 |
| 4,112,355 | A | * | 9/1978 | Gibson, Jr ............. G01R 31/50 |
| | | | | 324/609 |
| 6,581,453 | B1 | | 6/2003 | Thor |
| 7,472,749 | B2 | | 1/2009 | Churchill |
| 7,828,060 | B2 | | 11/2010 | Churchill |
| 7,992,315 | B2 | * | 8/2011 | Nonni ...................... G01B 3/46 |
| | | | | 33/542 |
| 8,061,053 | B2 | * | 11/2011 | Gillan ...................... G01B 5/12 |
| | | | | 33/544.4 |
| 8,336,225 | B1 | * | 12/2012 | Zhang ...................... G01B 3/28 |
| | | | | 33/542 |
| 8,601,704 | B2 | * | 12/2013 | Dalla Casa .............. G01B 3/46 |
| | | | | 33/542 |

(Continued)

FOREIGN PATENT DOCUMENTS

| | | |
|---|---|---|
| CN | 113028201 | 6/2021 |
| CN | 214662937 | 11/2021 |

OTHER PUBLICATIONS

"Pipe Draft, Tubing Drift & Casing Drift"; Hydrotestors; https://www.hydrotestors.com/products/drifts; accessed Sep. 6, 2023; 7 pages.

*Primary Examiner* — George B Bennett
(74) *Attorney, Agent, or Firm* — DILWORTH IP, LLC

(57)　　　ABSTRACT

A drift device, including a cylindrical main body having a hollow inner cavity, a front portion including a channel configured to receive a bumper, the cross bar including a central indentation, and a rear portion. The rear portion may include a plurality of openings or selectively removable panels. The cylindrical main body, the front portion, and the rear portion are formed together as a single piece.

20 Claims, 10 Drawing Sheets

(56) References Cited

U.S. PATENT DOCUMENTS

| | | | | |
|---|---|---|---|---|
| 9,429,412 | B2 * | 8/2016 | Nakamura | G01B 5/18 |
| 11,549,363 | B2 | 1/2023 | Bomersbach | |
| 11,644,307 | B2 * | 5/2023 | Gotusso | G01B 11/12 |
| | | | | 33/555.1 |
| 2012/0255189 | A1 * | 10/2012 | Gaillard | F16B 23/003 |
| | | | | 248/314 |
| 2015/0369015 | A1 | 12/2015 | Rastegar | |
| 2016/0202034 | A1 * | 7/2016 | Weiland | G01B 3/38 |
| | | | | 33/542 |

* cited by examiner

100

102

136

139

130

134

132    134    138

3D PRINTED DRIFT DEVICE

FIELD OF THE INVENTION

The present disclosure relates drifts for pipes, and more particularly, to a 3D printed drift device and method of making the same.

BACKGROUND

Drifts or drift devices are known and used for determining and verifying the diameter of pipes. These devices are used, for example, in the oilfield industry. A drift device may be dropped or pulled through the inside diameter of the pipe. The device determines whether the bore of a length of tubing or casing is restricted or obstructed.

Drift devices are typically comprised of metal and may include multiple parts. They are heavy and can cause damage to equipment or personnel when in use.

The present invention solves these and other problems in the prior art.

SUMMARY

An object of the present invention is to provide an improved drift device and method of manufacturing the same.

In one exemplary embodiment according to the present disclosure, a drift device is provided, including a cylindrical main body having a hollow inner cavity, a front portion configured to receive a bumper, the cross bar including a central indentation, and a rear portion, wherein the cylindrical main body, the front portion, and the rear portion are formed together as a single piece. The rear portion may include a plurality of openings and/or selectively removable panels.

The cylindrical main body, the front portion, and the rear portion may be formed together as a single piece by 3D printing. In some embodiments, the cylindrical main body, the front portion, and the rear portion are formed together as a single piece by a multi-step process including additive manufacturing step followed by a subtractive manufacturing step.

The front portion may include an opening and a cross bar, wherein the cross bar includes a channel, configured to receive the bumper, and a central indentation. In some embodiments, the front portion includes a central opening and a channel for receiving the bumper circumscribing the central opening. In some embodiments, the main body has a first diameter, wherein the rear portion is cylindrical and has a second diameter less than the first diameter.

In some embodiments, the plurality of selectively removable panels includes one or more semi-circular panels being removable to permit airflow through the front portion. The rear portion may include holes to receive a rope.

In some embodiments, the cylindrical main body includes a wall with a plurality of cavities inside the wall for buoyancy. The plurality of cavities may extend around the hollow inner cavity within the wall.

Further provided is a method of manufacturing a drift device, including steps of forming an oversized drift device by additive manufacturing, the oversized drift device including a cylindrical main body having a hollow inner cavity, a front portion, and a rear portion, wherein the cylindrical main body, the front portion, and the rear portion are formed together as a single piece, securing the oversized drift device in a lathe, and machining an outer surface of the main body of the oversized drift device in the lathe until a desired diameter of the main body is achieved.

The method may further include forming a plurality of selectively removable panels in the rear portion of the oversized drift device and/or removing at least one of the plurality of the selectively removable panels.

The method may further include forming a channel in the cross bar facing outward from a front surface of the front portion and/or securing a bumper in the channel.

In some embodiments, the step of forming the oversized drift device includes forming a plurality of cavities inside a wall of the cylindrical main body for buoyancy. The plurality of cavities may extend around the hollow inner cavity within the wall.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure.

Figure 1:
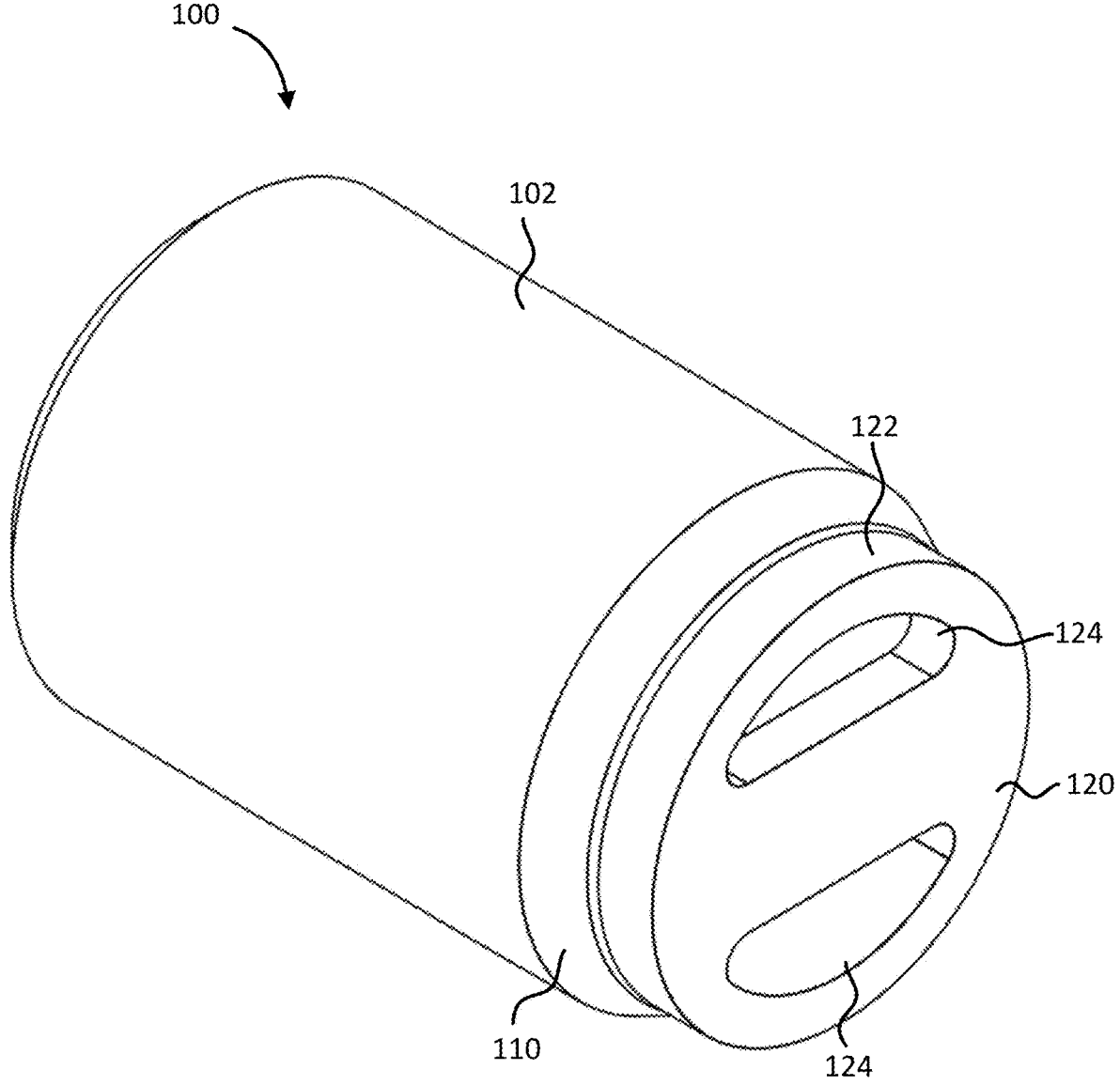
FIG. 1 is a rear isometric view of a drift device according to an exemplary embodiment of the present disclosure.

FIG. 1 is a rear isometric view of a drift device 100 according to an exemplary embodiment of the present disclosure. The drift device 100 includes a main body 102, cylindrical in shape, having a first diameter. The drift device 100 further includes a rear portion 120 having an outer surface 122 with a second diameter. In the exemplary embodiment, the second diameter is less than the first diameter. The drift device 100 further includes an angled surface 110 extending between the main body 102 and the rear portion 120. The rear portion 120 includes one or more openings 124 through a surface thereof which extend into a hollow cavity within the main body 102. A bar 126 may separate the openings 124 on the rear portion 120.

Figure 2:
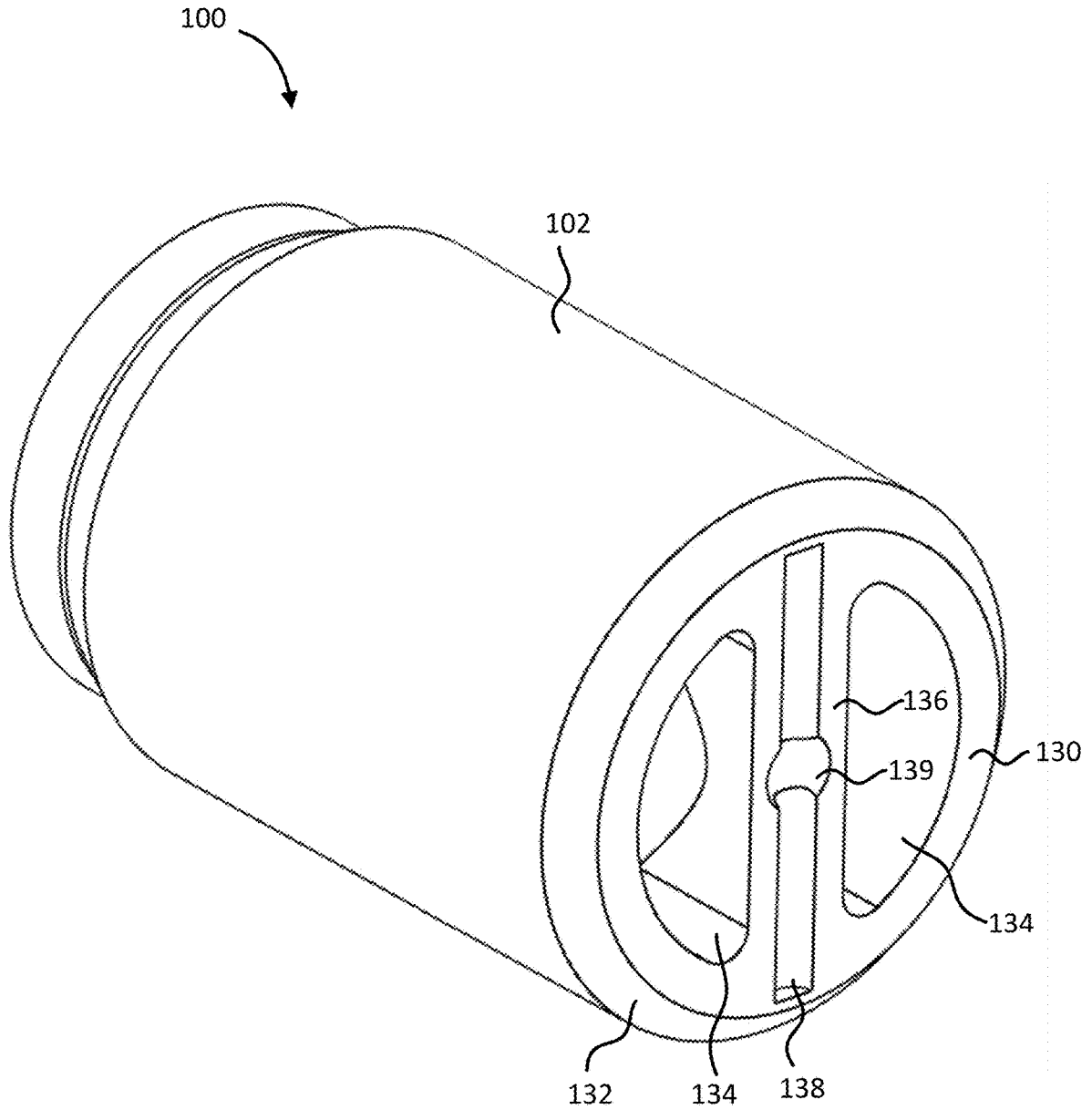
FIG. 2 is a front isometric view of the drift device shown in FIG. 1.

FIG. 2 is a front isometric view of the drift device 100 shown in FIG. 1. A front portion 130 of the drift device 100 includes one or more openings 134 extending into the hollow cavity within the main body 102. A bar 136 extends across the front portion 130 between the openings 134. In some embodiments, the bar 136 has a channel 138 and an indentation 139 in a center of the bar 136. The indentation 139 may optionally be a hole extending through the bar 136. As discussed in more detail below, the channel 138 may receive a bumper.

The drift device 100 further includes a beveled edge 132 between the front portion 130 and the main body 102. The beveled edge 132 helps to ease installation of the drift device 100 in the pipe. In the exemplary embodiment, the beveled edge 132 is at an approximately 45-degree angle.

Figures 3, 4:
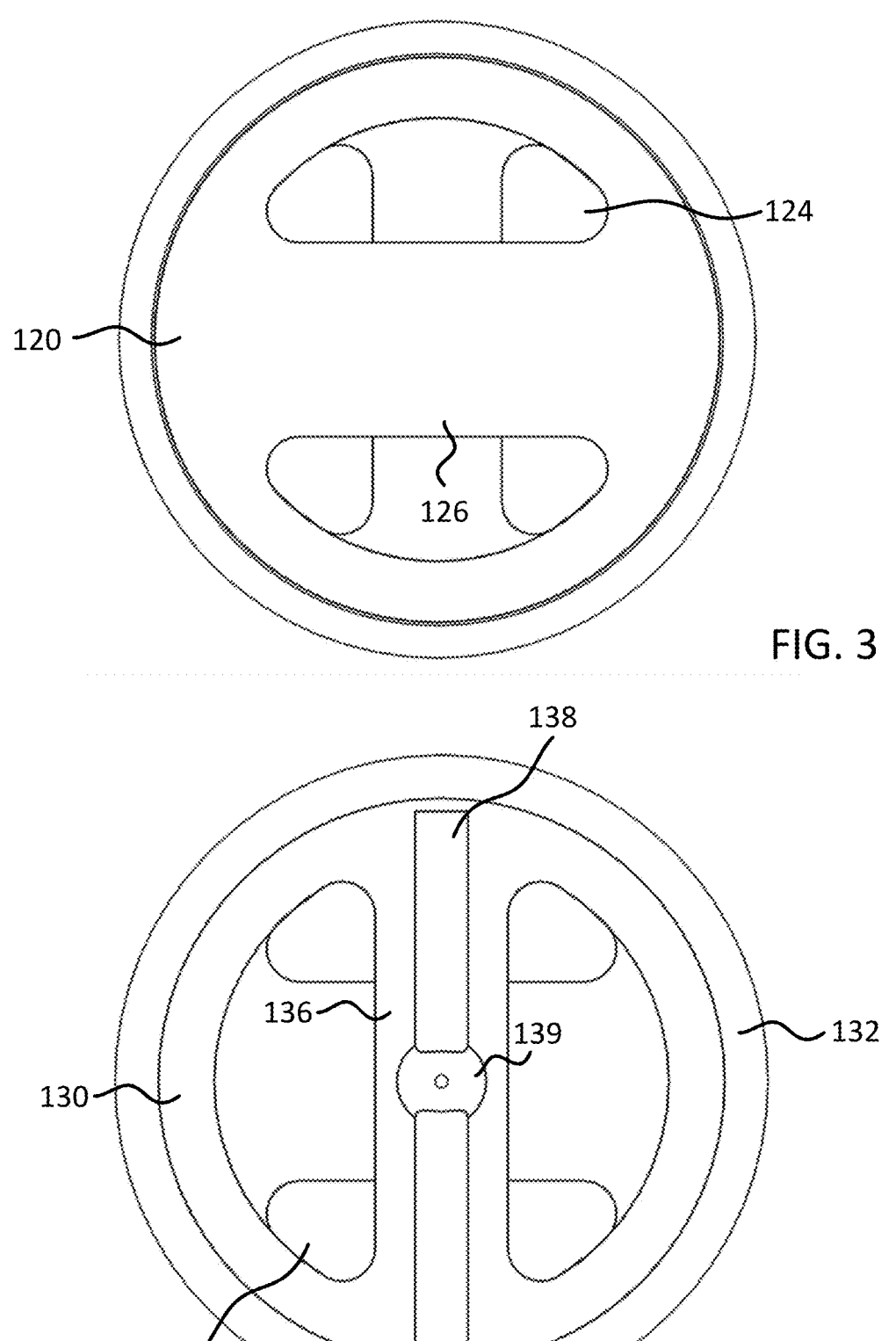
FIG. 3 is a rear view of the drift device shown in FIG. 1.
FIG. 4 is a front view of the drift device shown in FIG. 1.

FIG. 3 is a rear view of the drift device 100 shown in FIG. 1 and FIG. 4 is a front view of the drift device 100 shown in FIG. 1. The openings 124 in the rear of the drift device 100 and the openings 134 in the front of the drift device 100 may be formed in various shapes and sizes. Further, some embodiments may not include all of the openings 124,125 and/or have knockout panels for selectively exposing the openings.

Figure 5A:
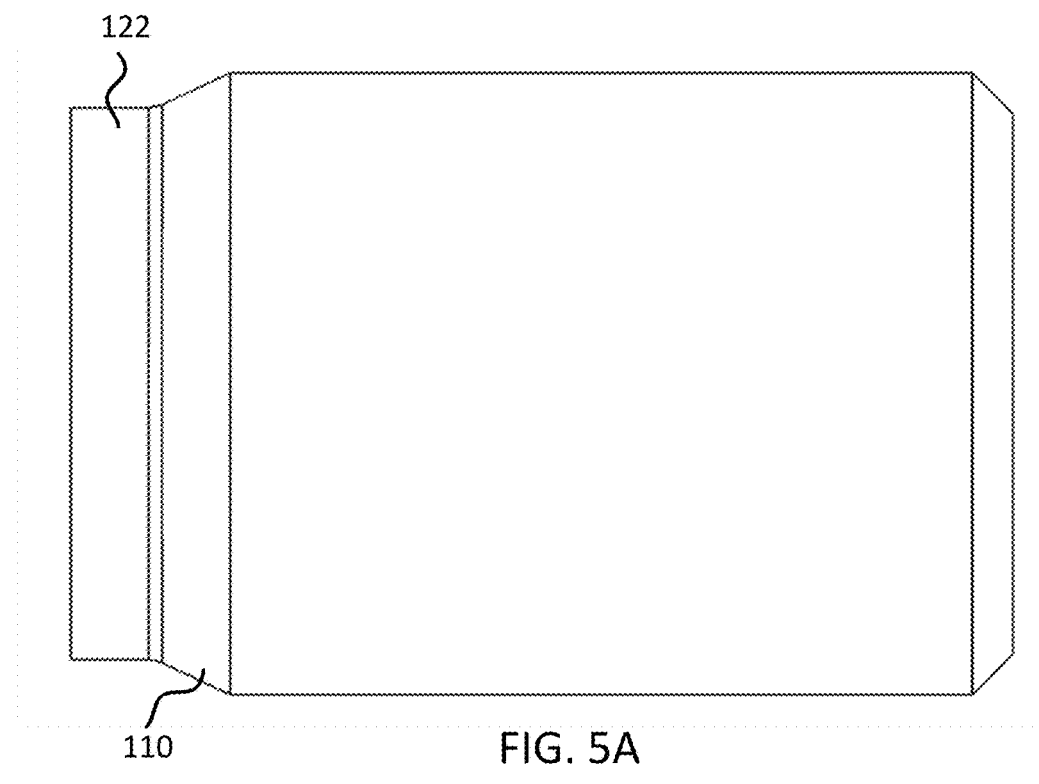
FIG. 5A is a side view of the drift device shown in FIG. 1.
Figure 5B:
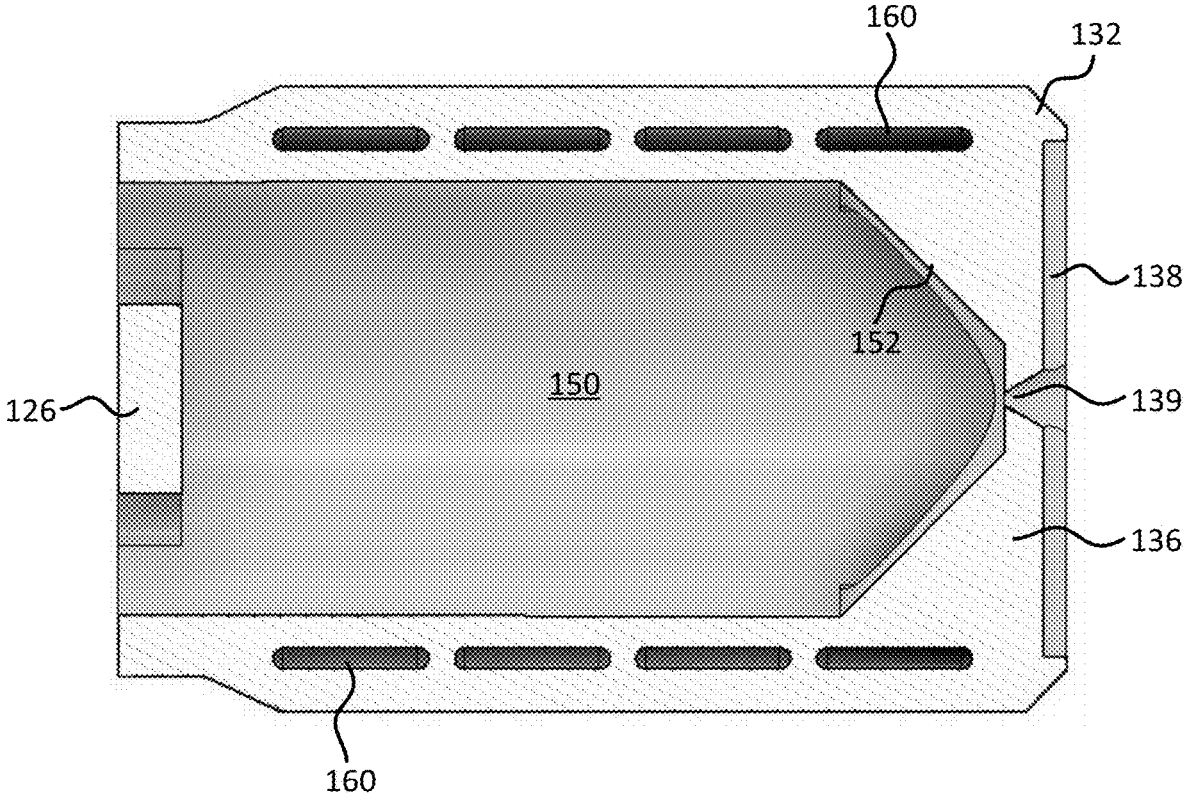
FIG. 5B is a side cutaway view of the drift device shown in FIG. 1.

FIG. 5A is a side view of the drift device 100 shown in FIG. 1. FIG. 5B is a side cutaway view of the drift device 100 shown in FIG. 1. As shown in FIG. 5B, the drift device 100 has a hollow interior cavity 150. In some embodiments, the bar 136 has a decreased thickness in the center and angled surfaces 152 on a back side of the bar 136.

In certain applications, it may be desired for the drift device 100 to have the ability to float. FIG. 5B illustrates optional cavities 160 or pockets in the wall of the main body 102 of the drift device 100. The cavities 160 reduce weight while also trapping air to increase the buoyancy of the drift device 100. In the exemplary embodiment, there are four cavities 160, each cavity 160 having a rounded rectangle shape in a longitudinal cross-section (as shown in FIG. 5B) and a circular shape in a lateral cross-section, i.e., with each cavity 160 extending entirely around the wall of the main body 102. However, the cavities 160 may be formed in different shapes, sizes, and/or quantities to achieve any desired buoyancy.

The sizes of the cavities 160 may be selected based on a volume of air necessary to make the drift device 100 at least neutrally buoyant in water. A weight of the drift device 100 submerged in water may be calculated using its volume and material specific gravity (SG). A buoyance force and the volume of air needed to make the drift device 100 neutral buoyant can then be determined. In exemplary embodiments, the total volume of the cavities 160 is greater than, e.g., double, the necessary volume. This provides a safety factor should one or more of the plurality of cavities 160 be compromised and/or leak. Based on the volume of air needed (e.g., plus the safety factor), dimensions of the individual cavities 160 are determined to achieve the total volume.

The outer surface 122 of the rear portion 120 and the indentation 139 of the bar 136 are configured to facilitate the drift device 100 being mounted in a lathe. The outer surface 122 acts as a chucking ring while the indentation 139 receives the tailstock of the lathe.

Figure 6:
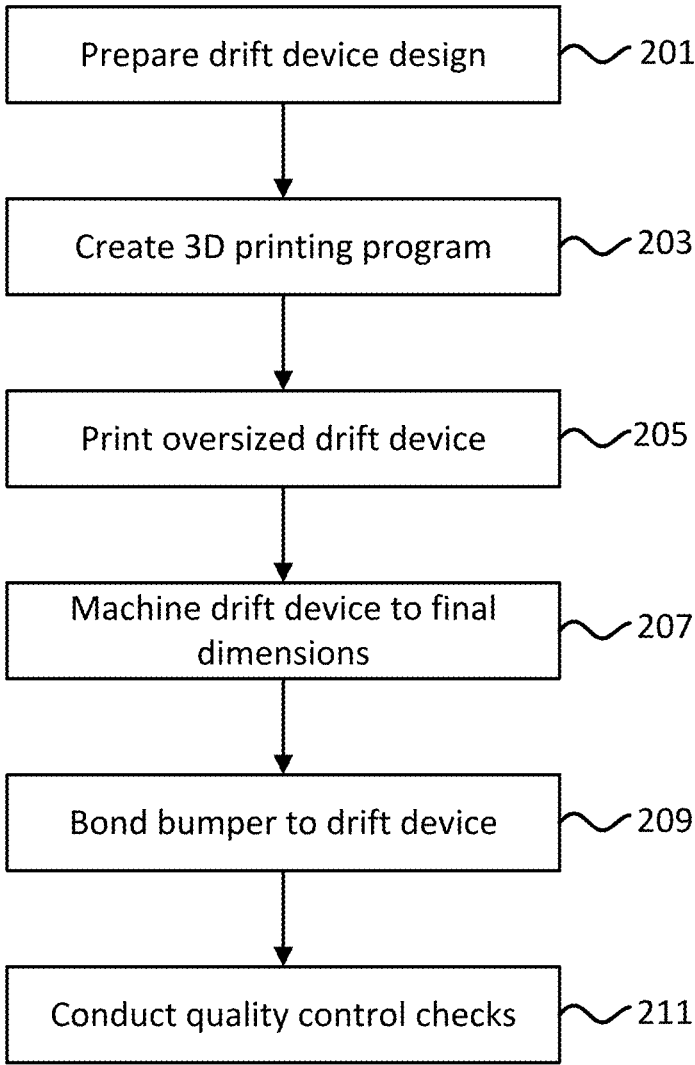
FIG. 6 illustrates a method of manufacturing according to an exemplary embodiment of the present disclosure.

An exemplary manufacturing method is illustrated in FIG. 6. In the exemplary method, a drift device is designed for a particular application based on customer input (step 201). The customer input may include, for example, a pipe diameter and a weight (e.g., which informs the wall thickness). The drift device is designed having the desired diameter using drift size data including pipe OD's, walls, weights, IDs, drift diameters, and/or drift lengths per API 5CT specifications. Using parametric modeling software, the drift device is designed with an oversized outer diameter (OD). In the exemplary embodiment, all angles are 45° or shallower to support each successive layer when 3D printing. From the created 3D model (e.g., 3D model) a 2D drawing may be made, if necessary, for manufacturing purposes.

The created model is then uploaded into slicing software to create a 3D printing program (step 203). The model is oriented and sliced into various slices, such as 0.75 mm tall slices. The width of each extrusion may, for example, be 1.2 mm wide. The number of layer walls shall be enough to maintain a solid wall thickness throughout the drift device. The model of the drift device is sliced and translated into a G-code program language for CNC tool paths. This program is then used in a 3D printing machine.

A drift device having the oversized OD is made by additive manufacturing, i.e., in the 3D printing machine using a polymer (step 205). In the exemplary embodiment, 1.75 mm diameter ASA filament is loaded into the drybox of the 3D printing machine. Relative humidity is preferably maintained under 25%, e.g., by enclosing the printer. The filament and fed to the extruder head. In the exemplary embodiment, the hotend temperature is set to 285° C. and the heat bed is set to 110° C. A thin layer of "ASA juice" (ASA and acetone mix) may be brushed onto the heat bed. The program created during the preparation stage is loaded and run.

Following the additive manufacturing step, the drift device includes the cylindrical main body having the hollow inner cavity, the front portion including at least one opening and a cross bar, and the rear portion. The cylindrical main body, the front portion, and the rear portion are preferably formed together as a single piece.

In a subsequent manufacturing step, the oversized drift device is machined to its final dimensions (step 207). The oversized drift device secured in a lathe via the outer surface 122 and the central indentation 139. For example, the lathe may be chucked on the drift device via the outer surface 122 and the face is squared up. The outer diameter of the outer surface 122 may be turned following an existing 25° angle off the OD. The drift device may then be un-chucked and turned around. The tailstock center is installed into the indentation 139. The drift device is spun in the lathe and the outer surface of the main body 102 is machined until a desired diameter (e.g., and surface texture) of the main body 102 is achieved (e.g., within 0.02"). The beveled edge 132 may also be machined in the lathe within the specified tolerance.

A bumper may then be attached to the drift device (step 209). For example, a ⅜" diameter O-ring material made of rubber (e.g., a buna O-ring material) may cut to the bumper bar channel length. A series of diagonal slices may be cut with a razor blade along the length of the O-ring material to strengthen the bond of the rubber O-ring material to the ASA plastic. An adhesive, such as 3M Scotch-Weld, may be used to bond the materials together. For example, two small lines of the adhesive may be applied to the bumper bar channel. The rubber O-ring material is placed in the channel, pressed firmly, and cured overnight. The bumper may be provided in different shapes, sizes, and orientations on the front of the drift device and is not limited having a linear or tubular shape. For example, the bumper may be circular or semi-circular and extend around the front of the drift device (see, e.g., FIG. 9B).

Optionally, the drift device may be marked for identification with a laser source (e.g., a MOPA Fiber Laser source). For example, marking may be done on the front portion 120 between the openings 124.

The drift device is inspected for quality control (step 211). Quality control checks may include, for example, the critical dimensions and ovality of the drift device against the manufacturing drawing. The dimensions are logged on an inspection report and retained.

Figure 7:
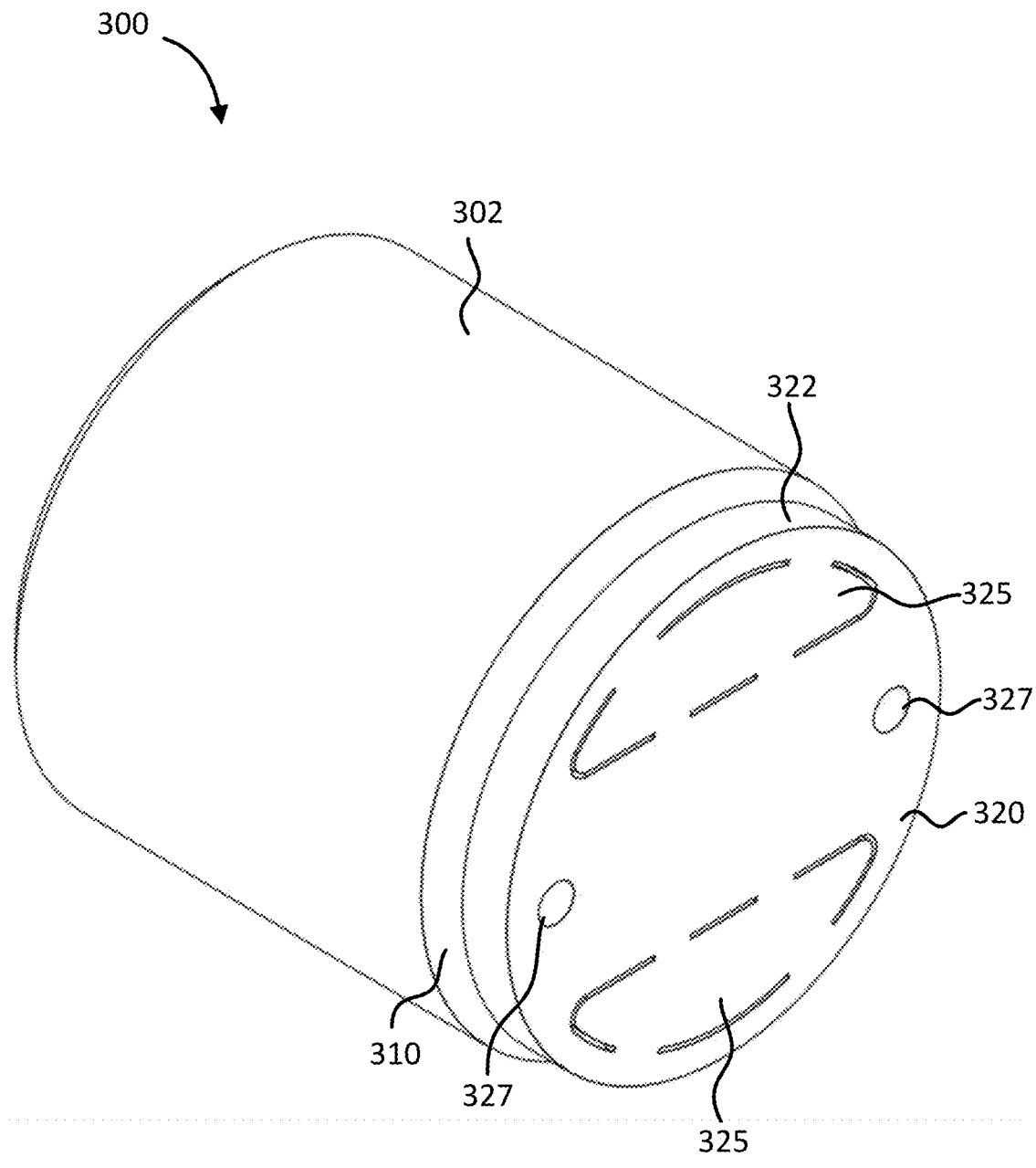
FIG. 7 is a rear isometric view of a drift device according to an exemplary embodiment of the present disclosure.

FIG. 7 is a rear isometric view of a drift device 300 according to an exemplary embodiment of the present disclosure. As illustrated, the drift devices may be made in different sizes, lengths, and/or proportions of length and diameter to accommodate different sized pipes and/or different applications. The drift device 300 includes a main body 302, a rear portion 320 having an outer surface 322, an angled surface 310 extending between the main body 302, and a rear portion 320.

The drift device 300 further includes a plurality of knock-out panels 325 on the rear portion 320. The knockout panels 325 are formed during manufacturing (e.g., in the additive manufacturing step) with a plurality of segmented slits made through the surface of the rear portion 320. In the exemplary embodiment, the knockout panels 325 are semi-circular in shape, though the shape is not limited thereto.

One or both of the knockout panels 325 can be selectively knocked out, and removed, to allow more airflow through the drift device 300 and increase the speed of the drift device 300. Alternatively, the knockout panels 325 may be left in place to restrict airflow and act as speed reducers (i.e., slowing down the drift device 300 in the pipe). In the exemplary embodiment, the knockout panels 325 can be removed by hand or with simple tools (e.g., hammer or punch) in the field to customize and configure the drift device 300 before use.

The drift device 300 further includes one or more holes 327 to allow for a rope to be attached to the rear portion 320 of the drift device 300, e.g., for pulling and/or carrying the drift device 300.

Figure 8A:
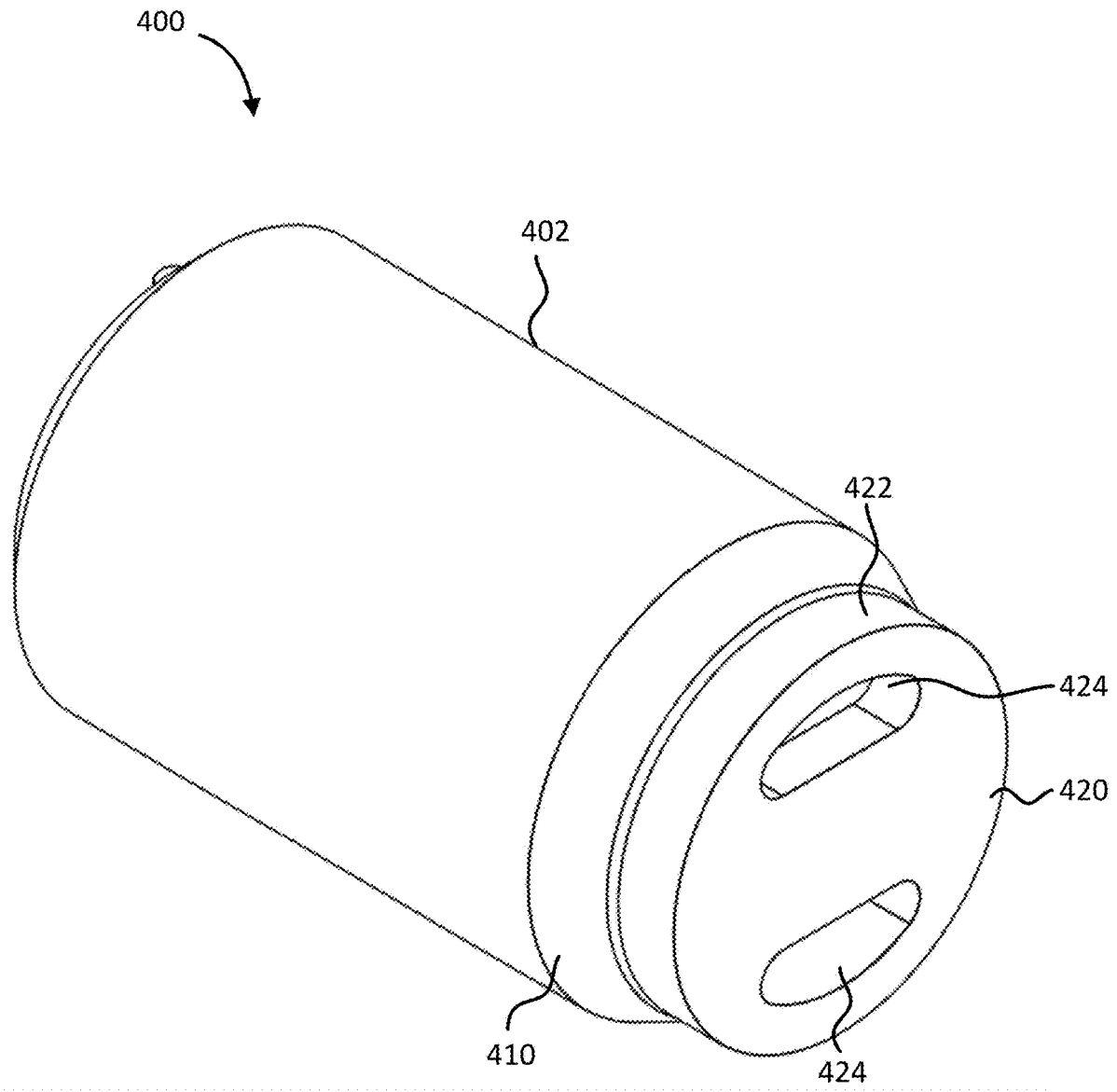
FIG. 8A is a rear isometric view of a drift device according to an exemplary embodiment of the present disclosure.

FIG. 8A is a rear isometric view of a drift device 400 according to an exemplary embodiment of the present disclosure. The drift device 400 has different dimensions and/or proportions than the previous two examples. The drift device 400 includes a main body 402, a rear portion 420 having an outer surface 422, an angled surface 410 extending between the main body 402, and a rear portion 420. The openings 424 in the rear portion 420 are smaller than the previous embodiments to reduce airflow.

Figure 8B:
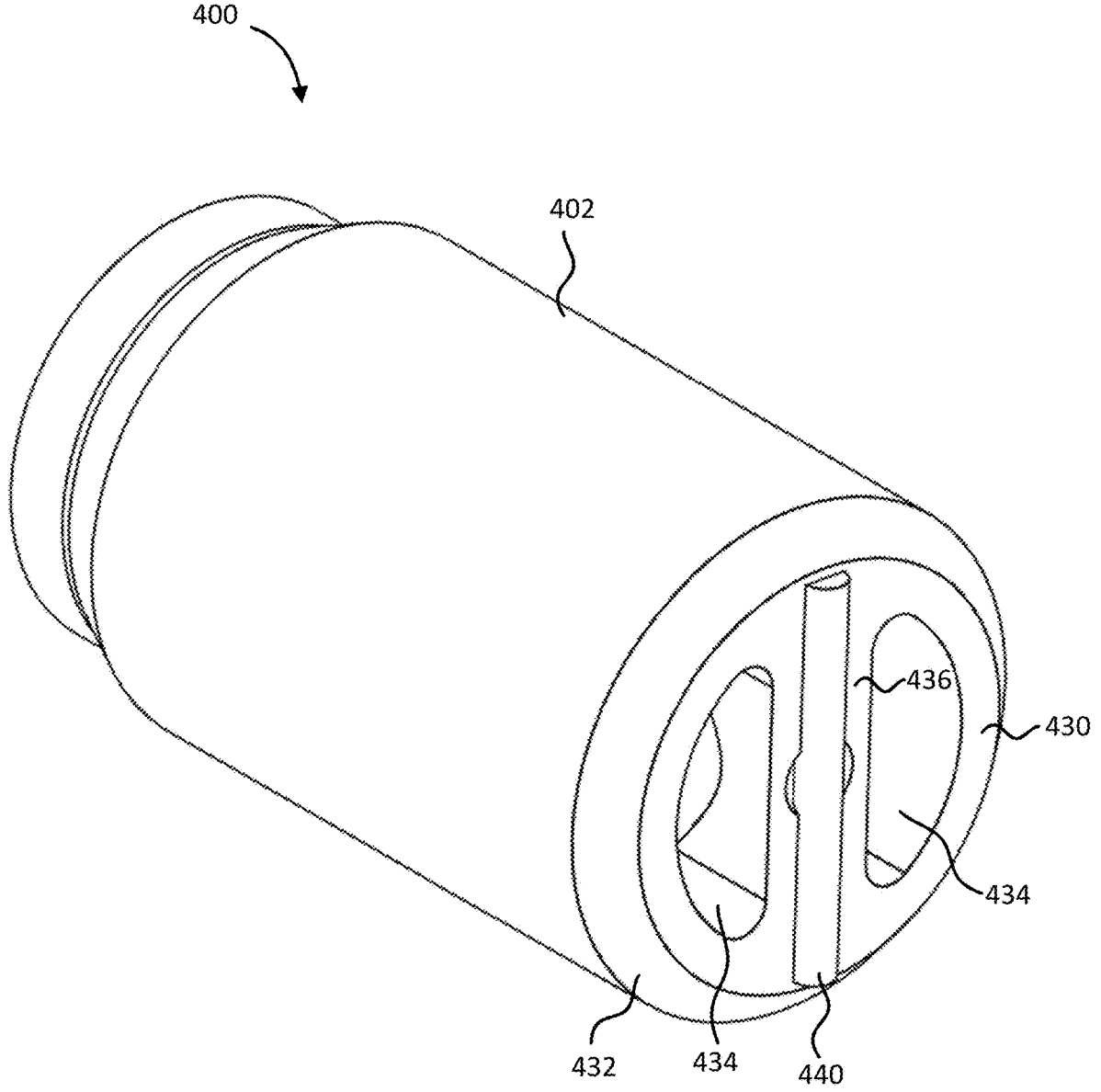
FIG. 8B is a front isometric view of the drift device shown in FIG. 8A.

FIG. 8B is a front isometric view of the drift device 400 shown in FIG. 8B with a bumper 440 added. In the exemplary embodiment, a bumper 440 is secured in the channel on the bar 436 between openings 434 on the front portion 430. The bumper 440 is made of an elastic and/or shock absorbing material, such as rubber, to absorb impacts when the drift device 400 reaches the end of the pipe.

Figure 9A:
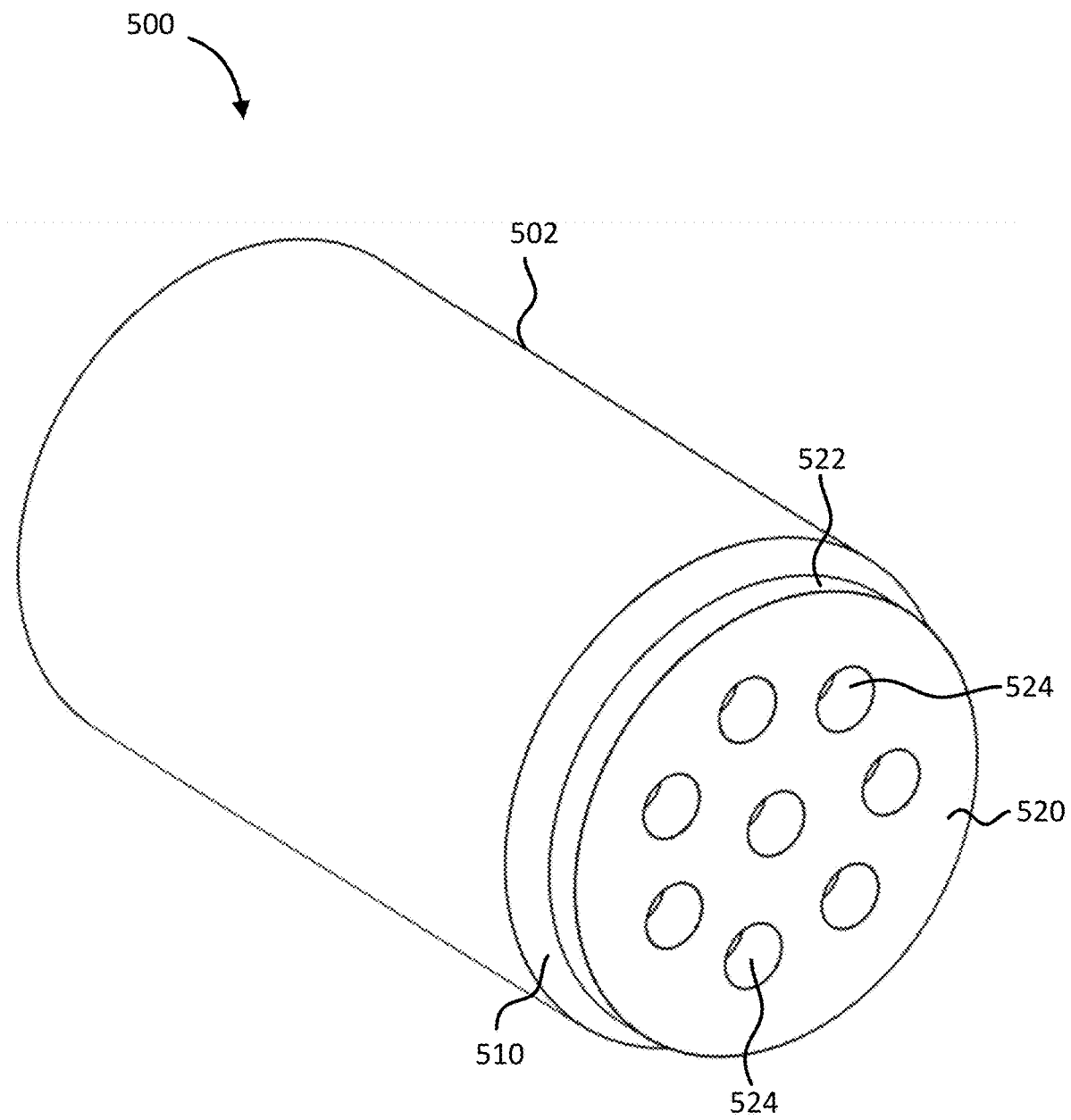
FIG. 9A is a rear isometric view of a drift device according to an exemplary embodiment of the present disclosure.

FIG. 9A is a rear isometric view of a drift device 500 according to an exemplary embodiment of the present disclosure. The drift device 500 has different dimensions and/or proportions than the previous two examples. The drift device 500 includes a main body 502, a rear portion 520 having an outer surface 522, an angled surface 510 extending between the main body 502, and a rear portion 520. In this embodiment, the openings 524 in the rear portion 520 are a plurality of circular holes.

Figure 9B:
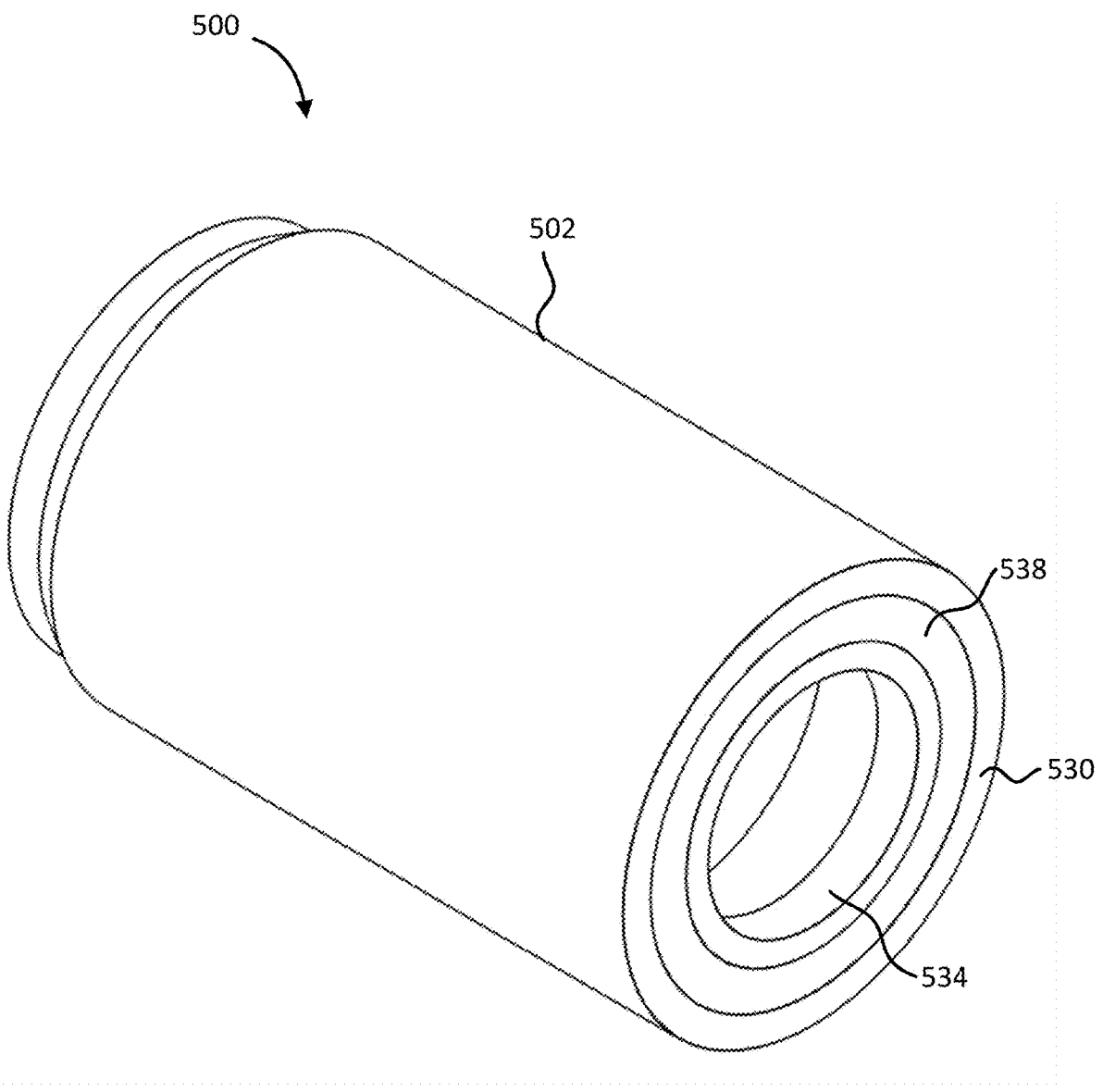
FIG. 9B is a front isometric view of the drift device shown in FIG. 9A.

FIG. 9B is a front isometric view of the drift device 500 shown in FIG. 9B. The drift device 500 has a single opening 534 without a crossbar. The front portion 530 has a channel 538, circumscribing the opening 534, for receiving a circular bumper. A bumper may be secured in the channel 538. The bumper may be made of an elastic and/or shock absorbing material, such as rubber, to absorb impacts when the drift device 500 reaches the end of the pipe. In another embodiment, the drift device 500 has the substantially circular channel 538 but no opening.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A drift device, comprising:
   a cylindrical main body having a hollow inner cavity;
   a front portion including a channel configured to receive a bumper; and
   a rear portion,
   wherein the cylindrical main body, the front portion, and the rear portion are formed together as a single piece.

2. The drift device of claim 1, wherein the cylindrical main body, the front portion, and the rear portion are formed together as a single piece by 3D printing.

3. The drift device of claim 1, wherein the cylindrical main body, the front portion, and the rear portion are formed together as a single piece by a multi-step process including additive manufacturing step followed by a subtractive manufacturing step.

4. The drift device of claim 1, wherein the front portion includes at least one opening and a cross bar, wherein the cross bar includes the channel, configured to receive the bumper, and a central indentation.

5. The drift device of claim 4, further comprising the bumper in the channel.

6. The drift device of claim 1, wherein the front portion includes a central opening and the channel to receive the bumper circumscribes the central opening.

7. The drift device of claim 1, wherein the main body has a first diameter, wherein the rear portion is cylindrical and has a second diameter less than the first diameter.

8. The drift device of claim 1, wherein the rear portion includes a plurality of openings or selectively removable panels.

9. The drift device of claim 8, wherein the plurality of selectively removable panels includes one or more semi-circular panels being removable to permit airflow through the front portion.

10. The drift device of claim 1, wherein the rear portion includes holes to receive a rope.

11. The drift device of claim 1, wherein the front portion has a beveled outer edge.

12. The drift device of claim 1, wherein the cylindrical main body includes a wall with a plurality of cavities inside the wall for buoyancy.

13. The drift device of claim 12, wherein the plurality of cavities extend around the hollow inner cavity within the wall.

14. A method of manufacturing a drift device, comprising steps of:

forming an oversized drift device by additive manufacturing, the oversized drift device including a cylindrical main body having a hollow inner cavity, a front portion, and a rear portion, wherein the cylindrical main body, the front portion, and the rear portion are formed together as a single piece;

securing the oversized drift device in a lathe; and machining an outer surface of the main body of the oversized drift device in the lathe until a desired diameter of the main body is achieved.

15. The method of claim 14, wherein the step of forming the oversized drift device includes forming a plurality of selectively removable panels in the rear portion of the oversized drift device.

16. The method of claim 15, further comprising a step of:

removing at least one of the plurality of the selectively removable panels.

17. The method of claim 14, wherein the step of forming the oversized drift device includes forming a channel in a front surface of the front portion.

18. The method of claim 17, further comprising a step of securing a bumper in the channel.

19. The method of claim 14, wherein the step of forming the oversized drift device includes forming a plurality of cavities inside a wall of the cylindrical main body for buoyancy.

20. The method of claim 19, wherein the plurality of cavities extend around the hollow inner cavity within the wall.

\* \* \* \* \*